March 9, 1971            N. HINES            3,568,243
ANIMAL SKINNING AND DRESSING ATTACHMENT
Filed July 29, 1969
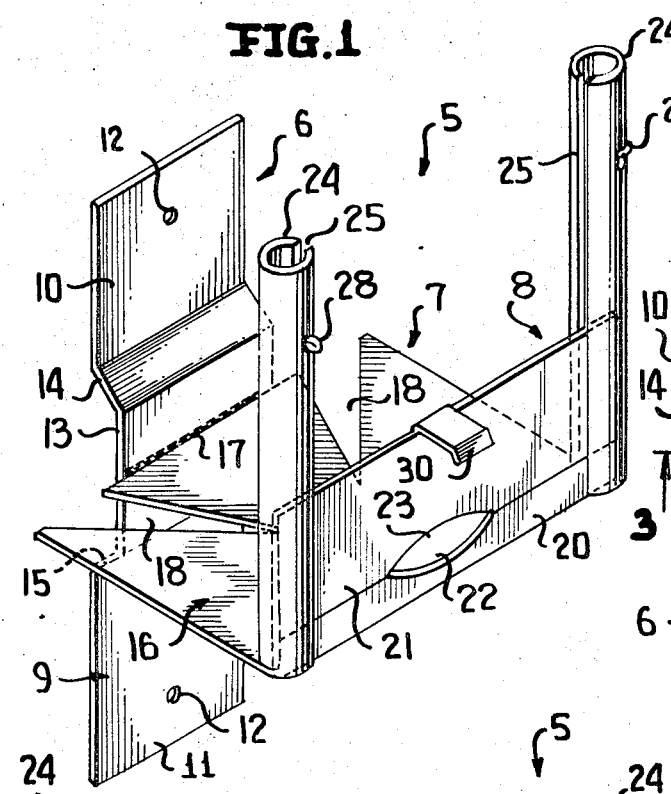
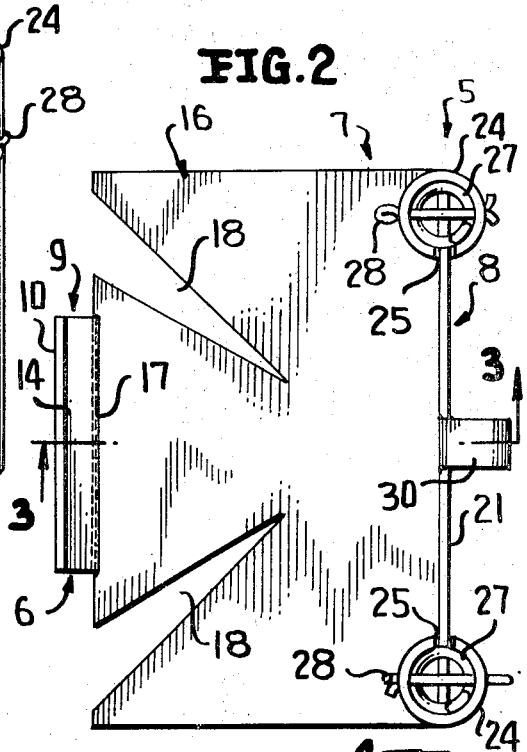
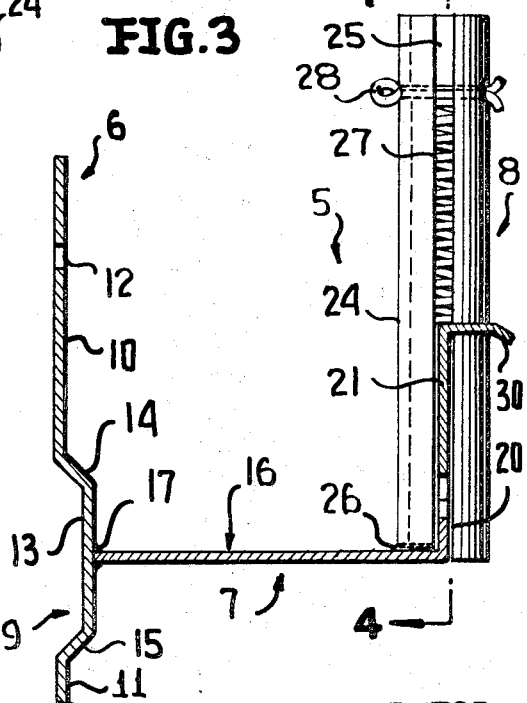
INVENTOR
NOAH HINES
By Baldwin Wight Diller & Brown
ATTORNEYS

United States Patent Office 3,568,243
Patented Mar. 9, 1971

3,568,243
ANIMAL SKINNING AND DRESSING ATTACHMENT
Noah Hines, General Delivery, Creston, La. 71020
Filed July 29, 1969, Ser. No. 845,728
Int. Cl. A22c 15/00
U.S. Cl. 17—44.2                             9 Claims

ABSTRACT OF THE DISCLOSURE

This disclosure relates to an animal skinning and dressing attachment which is primarily intended for use with small animals, such as squirrels, ducks, rabbits, etc. The attachment is particularly constructed to be secured to any convenient upright support, including a tree, and includes a horizontal plate having slots therein arranged in spread apart converging relation for anchoring the hind legs of an animal. In addition, at the forward edge of the plate there is a mechanism for gripping the neck of an animal, the mechanism including a vertically sliding door which is resiliently urged to a neck gripping position.

---

This invention relates in general to new and useful improvements in animal skinning and dressing devices, and more particularly to an animal skinning and dressing attachment which is particularly adapted for supporting small animals such as squirrels, rabbits, muskrats, etc.

It is well known that in order to efficiently skin and dress an animal, it is necessary that the animal be suitably supported so that one may have his hands free to perform the necessary skinning and/or dressing operation. Accordingly, not only must the attachment be extremely simple so as to be relatively inexpensive and therefore economically feasible, it also must provide for the secure anchoring of the animal both from the front and the back.

In accordance with this invention, there is provided a simple animal skinning and dressing attachment which is conveniently formed of sheet metal and wherein the various components thereof are readily securable together so as to be economically feasible, and at the same time suitable means are provided for positively anchoring an animal both by the rear legs thereof and by the neck thereof.

One of the primary features of the animal skinning and dressing attachment is the construction of a support member thereof which is in the form of a vertically extending plate which may be readily secured to any convenient support, including a tree.

Another specific feature of this invention is the construction of mechanism for retaining an animal by its neck, the mechanism including a vertically sliding door which is provided in the lower edge thereof with a neck receiving notch, the door being carried by two vertical guides which have associated therewith resilient means constantly urging the door towards a gripping position.

Another feature of the invention is the specific construction of the guides for the door, the guides being formed of tubular members having opposed slots therein for receiving edge portions of the doors, and the guides having received in the upper portions thereof springs which engage the upper edge of the door and constantly urge the door downwardly.

With the above and other objects in view that will hereinafter appear, the nature of the invention will be more clearly understood by reference to the following detailed description, the appended claims and the several views illustrated in the accompanying drawing:

In the drawing:

FIG. 1 is a front top perspective view of the animal skinning and dressing attachment which is the subject of this invention and shows the specific details thereof.

FIG. 2 is a plan view of the attachment of FIG. 1 and shows the specific configuration of the animal leg receiving slots in the horizontal plate thereof.

FIG. 3 is vertical sectional view taken along the line 3—3 of FIG. 2 and shows the specific cross sectional details of the attachment.

FIG. 4 is a transverse vertical sectional view taken along the line 4—4 of FIG. 3 and shows specifically the details of the mounting of the door.

Referring now to the drawings in detail, it will be seen that there is illustrated therein the animal skinning and dressing attachment which is the subject of this invention, the attachment being generally identified by the numeral 5. The attachment 5 is formed basically of three components. These include a support member, which is generally identified by the numeral 6, a first animal retaining device, which is generally identified by the numeral 7, and a second animal retaining device, which is generally identified by the numeral 8.

The support member 6 is in the form of an elongated strip of sheet metal 9 which is normally vertically disposed in the operative position of the attachment 5 and which includes an upper end portion 10 and a lower end portion 11 which are disposed coplanar and have suitable fastener receiving openings 12 formed therein. It is to be understood that the support member 6 may be readily mounted on any upright support, including a convenient tree, by driving suitable fasteners through the openings 12.

It is also to be noted that the plate 9 has a forwardly offset central portion 13 which is connected to the upper end portion 10 by means of a sloping portion 14 and to the lower end portion 11 by a sloping portion 15. The reason for the forward offsetting of the central portion 13 will become apparent hereinafter.

The first animal retaining device 7 is in the form of a plate 16. The plate 16 is generally rectangular in outline and is secured to the central portion 13 of the support member 6 in a horizontal position as by welding 17. The plate 16 is provided with a pair of forwardly converging slots 18 which are disposed in widely spaced relation so as to facilitate the supporting of an animal by the legs thereof, preferably the rear legs, with the legs in a spread apart condition. In order to facilitate the positioning and anchoring of an animal's legs within the slots 18, it is to be noted that the slots are of a tapered construction with the slots opening through the rear edge of the plate 16.

It will be readily apparent that an animal may be anchored relative to the attachment 5 by its legs only by merely easily positioning the desired portions of the legs within the wide open ends of the slots 18 and then drawing the animal forward until the legs are wedged in the slots 18. At this time it is pointed out that the support member 6 is much narrower than the plate 16 and is secured to the central portion of the rear edge of the plate 16 intermediate the slots 18. It is also to be noted that by forwardly offsetting the central portion 13 of the support member 6, even if the support member 6 is secured to a wall, ample space will be provided between the wall or other support and the rear edge of the plate 16 to facilitate the positioning of an animal's legs within the slots 18.

The second animal retaining device 8 is disposed at the forward edge of the plate 16 with the plate 16 being provided at its forward edge with an upturned flange 20 which forms a part of the device 8. The flange 20 cooperates with a vertically sliding door 21 for clamping an animal about the neck thereof. For this purpose, the flange 20 and the door 21 are provided with cooperating recesses 22 and 23, respectively, into which an animal's neck is to be positioned.

It is to be noted that the door 21 is mounted for vertical sliding movement by means of a pair of upright guides 24. The guides 24 are in the form of sections of tubular members each having a continuous vertical slot 25 formed therein.

The guides 24 have their lower ends seated on the forward edge portion of the plate 16 and have the slots 25 thereof oriented into aligned relation by having the lower portion of the slots 25 receiving end portions of the flanges 20. The guides 24 are secured to the plate 16 in any desired manner, such as by welding as at 26 (FIG. 3).

It is to be noted that the spacing of the guides 24 is such as to provide for the remote end portions of the door 21 to be fully positioned within the guides, as is clearly shown in FIG. 4 whereby the door 21 will freely move vertically without cocking or otherwise jamming. At the same time, the specific relationship between the door 21 and the guides 24 provides for an ease of mounting means to resiliently urge the door 21 constantly to an animal gripping position. As is clearly shown in FIG. 24, each of the guides 24 has positioned therein a coil spring 27 which has the lower end thereof bearing against the upper edge of the door 21. Upward movement of each coil spring 27 within its associated guide 24 is prevented simply by passing a pin 28 through an upper portion of each of the guides 24. As is clearly shown in FIGS. 2 and 3, the pin 28 may be conveniently in the form of a cotter pin.

In order to facilitate the lifting of the door 21 to pass a head of an animal between the lower edge of the door 21 and the upper edge of the flange 20, the door 21 has formed on the upper edge thereof a centrally located, forwardly projecting handle 30. When it is desired to anchor an animal by its neck in the attachment 5, one merely needs to lift the door 21 by one hand while positioning the animal relative to the device 8 by the other hand. After the animal's neck is properly positioned within the recess 22 in the flange 20, the door 21 is released. The door will then automatically clamp the animal's neck so as to retain the animal in place.

In the use of the attachment 5, as indicated above, it is conveniently secured to any suitable support by driving fasteners through the openings 12. Thereafter, an animal to be skinned and dressed is selectively secured to the animal skinning and dressing attachment 5 either by its head or neck or by its legs, preferably the hind legs of a four legged animal. It is to be understood that when the animal is retained in place by the attachment 5 by its legs, it will be suspended beneath the plate 16. It will be readily apparent that the animal may be suspended from the attachment 5 either with its back up or its stomach up toward the person performing the skinning and dressing operation.

It will also be readily apparent to one familiar with the use of animal skinning and dressing attachments that the attachment of this invention is readily adaptable to practically all small animals such as squirrels, ducks, rabbits, chickens, muskrats, etc. It also can be very useful in taxidermic work.

Although only a preferred embodiment of the animal skinning and dressing attachment has been specifically illustrated and described herin, it is to be understood that minor variations may be made therein without departing from the spirit of the invention.

I claim:

1. An animal skinning and dressing attachment comprising a support member, a first animal retaining device fixedly carried by said support member and projecting outwardly therefrom, and a second animal retaining device carried by said first animal retaining device remote from said support member.

2. The animal skinning and dressing attachment of claim 1 wherein said first animal retaining device is in the form of a plate having forwardly converging slots for receiving a pair of animal legs in spread apart and wedged relation.

3. The animal skinning and dressing attachment of claim 1 wherein said first animal retaining device is in the form of a plate having forwardly converging slots for receiving a pair of animal legs in spread apart and wedged relation, said slots opening through a rear edge of said plate, and that portion of said support member to which said plate is secured being forwardly offset to provide clearance between the rear edge of said plate and a support to which said support member may be secured.

4. The animal skinning and dressing attachment of claim 1 wherein said first animal retaining device is in the form of a plate having an upstanding flange at the forward end thereof, said flange forming part of said second animal retaining device and a vertically sliding door cooperable with said flange to form a mechanism for gripping an animal neck.

5. The animal skinning and dressing attachment of claim 4 wherein said second animal retaining device also includes a pair of upright guides for said door carried by said plate, and resilient means associated with said guides and said door constantly urging said door to an animal neck retaining position.

6. The animal skinning and dressing attachment of claim 4 wherein said second animal retaining device also includes a pair of upright guides for said door carried by said plate, and resilient means associated with said guides and said door constantly urging said door to an animal neck retaining position, said guides being of tubular construction with said resilient means being disposed therein.

7. The animal skinning and dressing attachment of claim 4 wherein said second animal retaining device also includes a pair of upright guides for said door carried by said plate, and resilient means associated with said guides and said door constantly urging said door to an animal neck retaining position, said guides being of tubular construction with said resilient means being disposed therein and having opposed vertical slots receiving edge portions of said door in guided relation.

8. The animal skinning and dressing attachment of claim 1 wherein said second animal retaining device includes a pair of upright tubular guides individually supported by said first animal retaining device in spaced apart relation, said guides having opposed vertical slots therein, a vertically sliding door carried by said guides with edge portions of said door being seated in said slot, said door having a lower edge formed with an animal neck receiving recess, and resilient means within said guides reacting on said door to constantly urge said door to an animal retaining position.

9. The animal skinning and dressing attachment of claim 1 wherein said first animal retaining device is in the form of a plate having forwardly converging slots for receiving a pair of animal legs in spread apart and wedged relation, said slots opening through a rear edge of said plate, said support member being vertically disposed and secured to said plate rear edge intermediate said slots, and that portion of said support member to which said plate is secured being forwardly offset to assure clearance between said plate rear edge and any support member to which said support member may be secured.

References Cited

UNITED STATES PATENTS

| | | | |
|---|---|---|---|
| 2,625,707 | 1/1953 | Liittjohann | 17—44.1 |
| 2,731,665 | 1/1956 | Zebarth | 17—44.1 |
| 3,137,030 | 6/1964 | Varner | 17—44.2 |

LUCIE H. LAUDENSLAGER, Primary Examiner